United States Patent
Jung

(10) Patent No.: US 12,220,624 B2
(45) Date of Patent: Feb. 11, 2025

(54) DISTANCE RECOMMENDATION DEVICE FOR GOLF IN CONSIDERATION OF WIND CHARACTERISTICS

(71) Applicant: RNDUS CO., LTD., Seoul (KR)

(72) Inventor: Kyu-Shik Jung, Seongnam-si (KR)

(73) Assignee: RNDUS CO., LTD., Seoul (KR)

( * ) Notice: Subject to any disclaimer, the term of this patent is extended or adjusted under 35 U.S.C. 154(b) by 0 days.

(21) Appl. No.: 18/009,987

(22) PCT Filed: Mar. 22, 2021

(86) PCT No.: PCT/KR2021/003475
§ 371 (c)(1),
(2) Date: Dec. 13, 2022

(87) PCT Pub. No.: WO2022/085876
PCT Pub. Date: Apr. 28, 2022

(65) Prior Publication Data
US 2023/0226433 A1 Jul. 20, 2023

(30) Foreign Application Priority Data
Oct. 21, 2020 (KR) .................. 10-2020-0136639

(51) Int. Cl.
*A63B 71/06* (2006.01)
*A63B 102/32* (2015.01)

(52) U.S. Cl.
CPC ...... *A63B 71/0622* (2013.01); *A63B 2102/32* (2015.10); *A63B 2220/20* (2013.01); *A63B 2220/76* (2013.01)

(58) Field of Classification Search
CPC ............ A63B 71/0622; A63B 2102/32; A63B 2220/20; A63B 2220/76
See application file for complete search history.

(56) References Cited

U.S. PATENT DOCUMENTS

| | | | | |
|---|---|---|---|---|
| 5,562,285 A | * | 10/1996 | Anfinsen | A63B 69/3658 473/192 |
| 2009/0326887 A1 | * | 12/2009 | Chan | A63B 69/36 703/6 |

(Continued)

FOREIGN PATENT DOCUMENTS

| | | | |
|---|---|---|---|
| JP | 2013506529 A | | 2/2013 |
| KR | 20110002733 A | * | 1/2011 |

(Continued)

OTHER PUBLICATIONS

KR10-2020-0136639 1st Office Action dated Jan. 18, 2022.
PCT/KR2021/003475 Search Report dated on Jul. 19, 2021.
PCT/KR2021/003475 Written Opinion dated on Jul. 19, 2021.

*Primary Examiner* — Steven B Wong

(57) ABSTRACT

A recommended distance provision method for providing a recommended distance in consideration of characteristics of wind by a distance recommendation device for golf is proposed. The method includes calculating a horizontal distance, a vertical distance, and the recommended distance of a shot, which are distances to a target without considering an influence of the wind, on the basis of measurement information including a straight-line distance to the target and an inclination to the target, calculating a horizontal distance correction value for the horizontal distance on the basis of information on a wind direction and a wind speed, calculating an adjusted landing angle for a preset landing angle on the basis of the information on the wind direction and the wind speed, and calculating an additional distance correction value, and calculating a final recommended distance by adding the calculated additional distance correction value and the horizontal distance correction value.

5 Claims, 4 Drawing Sheets

(56) References Cited

U.S. PATENT DOCUMENTS

| | | | |
|---|---|---|---|
| 2009/0326894 A1* | 12/2009 | Chan | A63B 24/0021 703/9 |
| 2010/0184534 A1* | 7/2010 | Chan | G01W 1/10 473/415 |
| 2010/0225535 A1* | 9/2010 | Li | A63B 57/00 342/357.34 |
| 2015/0105172 A1* | 4/2015 | Thurman | A63B 71/0669 473/199 |
| 2019/0094343 A1* | 3/2019 | Nyhart | G01S 7/51 |
| 2023/0148205 A1* | 5/2023 | Kim | A63B 71/0622 |

FOREIGN PATENT DOCUMENTS

| | | |
|---|---|---|
| KR | 1020110002733 A | 1/2011 |
| KR | 1020140002365 A | 1/2014 |
| KR | 1020180037517 A | 4/2018 |
| KR | 101933861 B | 1/2019 |

* cited by examiner

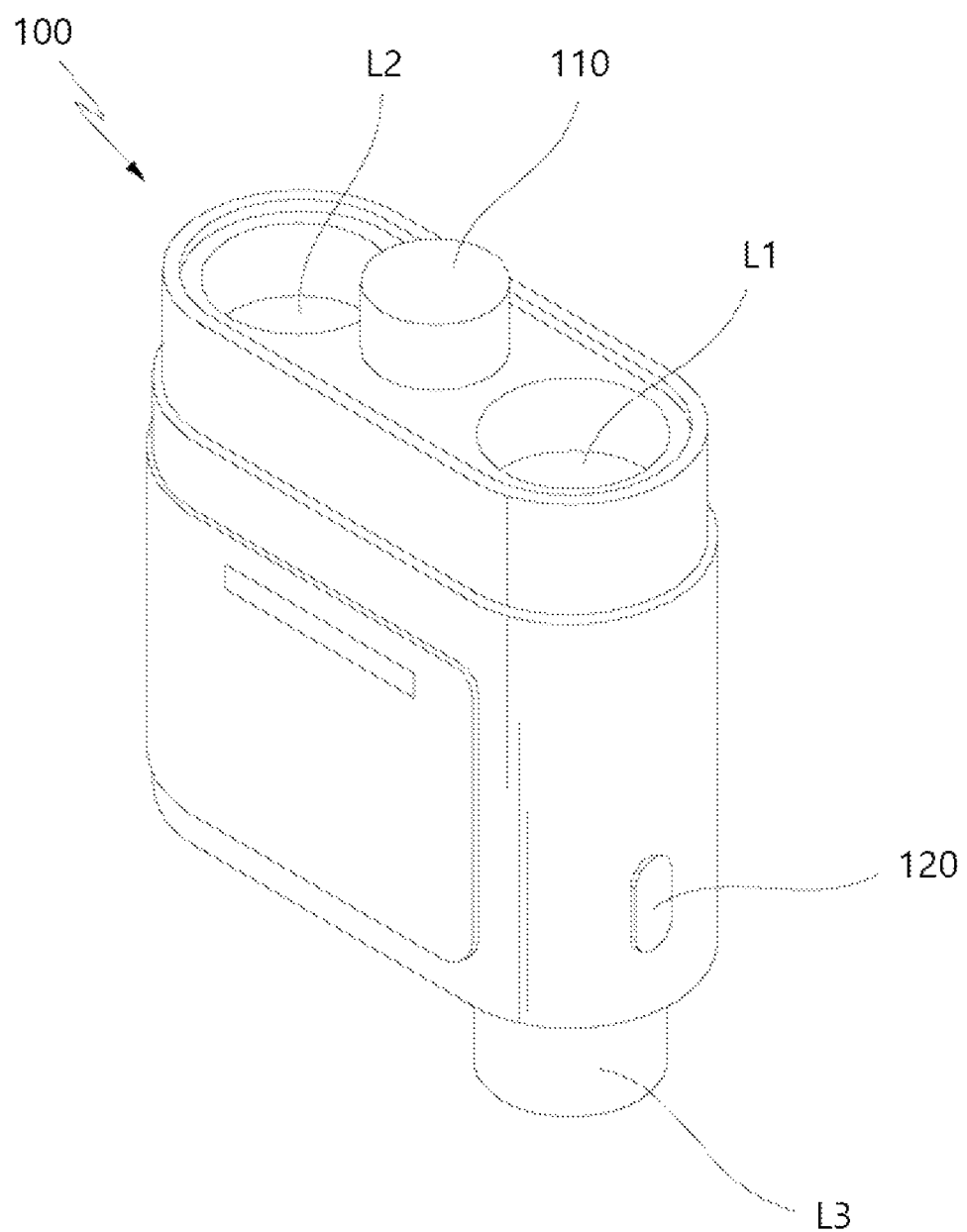
【Fig. 1】

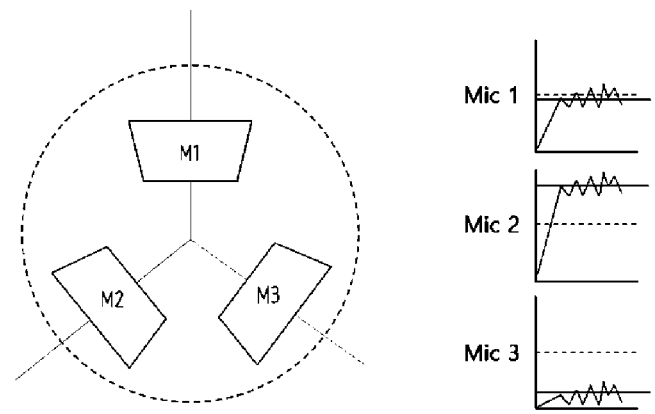
【Fig. 2】
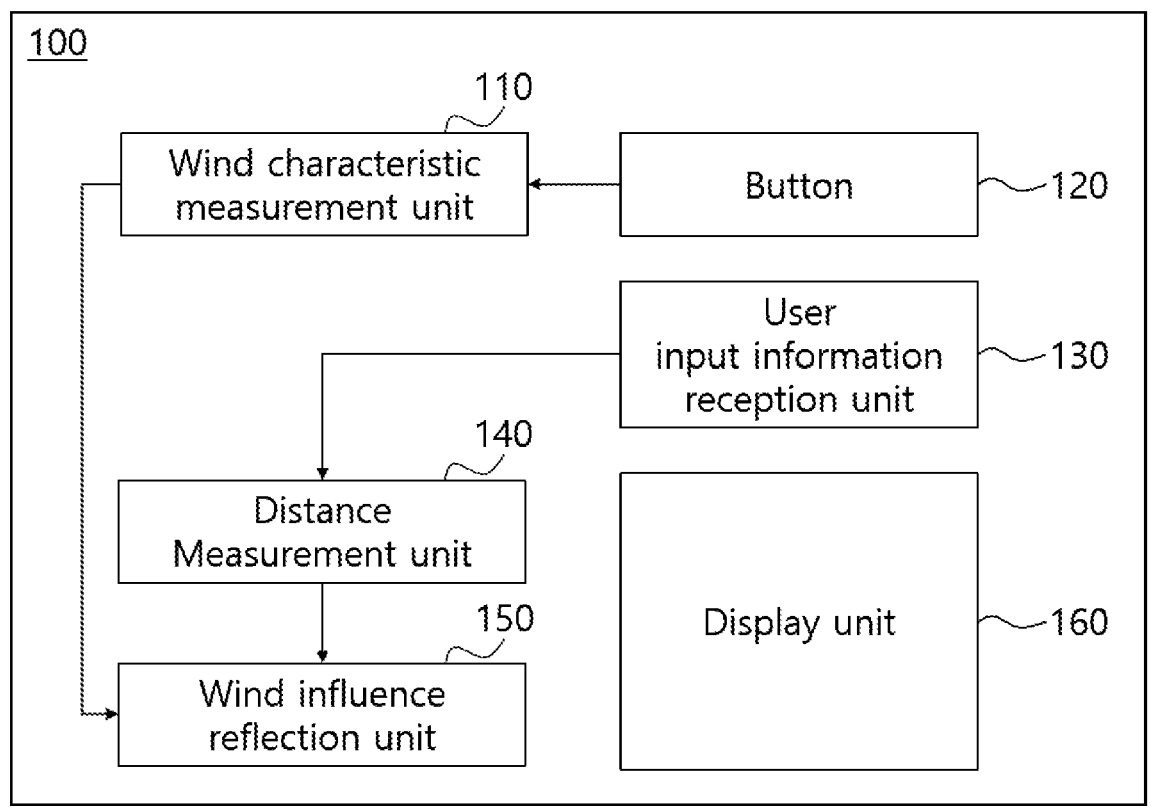
【Fig. 3】

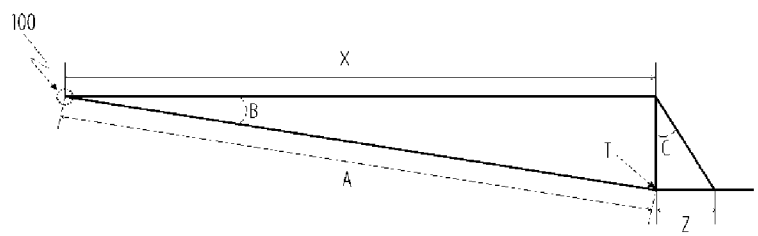
【Fig. 4】
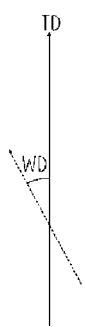
【Fig. 5】

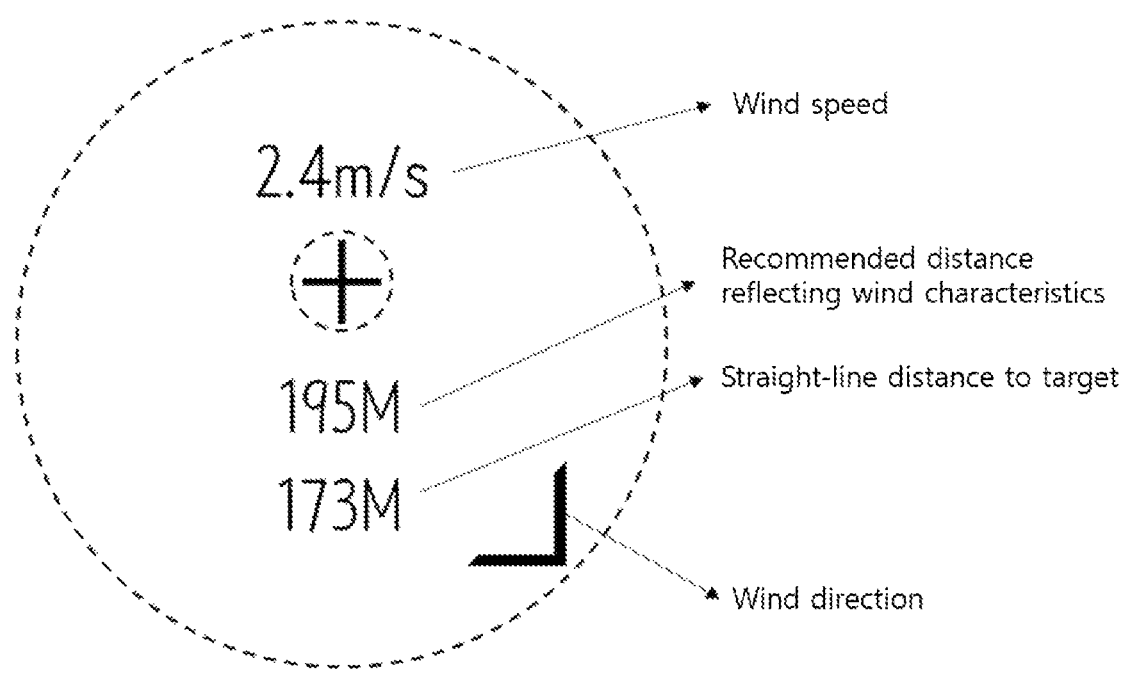
[Fig. 6]

DISTANCE RECOMMENDATION DEVICE FOR GOLF IN CONSIDERATION OF WIND CHARACTERISTICS

CROSS REFERENCE TO RELATED APPLICATIONS

This application is a 371 National Stage application of International Application No. PCT/KR2021/003475 tiled on Mar. 22, 2021, which claims priority of Korea Patent (KR) application Serial Number 10-2020-0136639, filed on Oct. 21, 2020, all of which are incorporated herein by reference in their entireties.

TECHNICAL FIELD

The present disclosure relates to a distance recommendation device for golf in consideration of wind characteristics and, more particularly, to a distance recommendation device for golf in consideration of wind characteristics measured by the device itself to generate information on a recommended distance to a target.

BACKGROUND ART

Recently, as golf facilities such as screen golf courses and indoor golf driving ranges increase, golf is gradually developing a popular sport in South Korea. In particular, as the golf population increases, the number of golfers who go out and play on golf courses is also increasing.

In order for a golfer playing a round on a course to hit a good shot, several factors should be considered. The most important factor is distance information including a distance from a position of a golf ball to a pin, and weather information including the intensity and the direction of wind currently blowing in the field. That is, knowing an exact distance to a bunker, a water hazard, or a green, which are placed on each course, may help the golfer select a right club for the exact distance, and knowing a direction and speed of the wind currently blowing on the field may help the golfer hit a precise shot while adjusting a strength and direction of the shot in consideration of the direction and speed of the current wind.

Golf distance measurement methods according to the related art are largely divided into two methods. One method is a distance measurement method using a laser, and the other method is a distance measurement method using a GPS. The distance measurement method using the laser is a method of emitting a laser beam toward a target, measuring a time when a portion of the emitted laser beam is reflected back to the target, and measuring a distance to the target by multiplying the measured time and the speed of the laser beam. Such a laser distance measurement method has an advantage in which the distance to the target may be measured very accurately by accurately detecting the time when the laser beam is reflected and returned. However, when used at a long distance such as 200 yards or more, accurate aiming of the laser at the target is difficult due to slight shaking of the hand holding a laser device, and thus there is a problem that the method is difficult to be used on a tee ground.

Meanwhile, the distance measurement method using the Global Positioning System (GPS) is performed by a method that receives navigation data and pseudo-random-noise (PRN) codes by a GPS receiver and calculates a distance from the GPS receiver to each satellite. In this case, three-dimensional coordinates may be determined by triangulation through each piece of the distance information generated through the GPS receiver, whereby latitudes, longitudes, and altitudes of the GPS receiver may be obtained. Such a distance measurement method using the GPS has an advantage in which the corresponding coordinates may be obtained from any position on the earth. However, in a situation where a sophisticated approach shot such as a pitch shot, a chip shot, or the like is required, there is a problem that utilization is low because an error range of the coordinates measured by the GPS may reach as wide as several meters.

Meanwhile, in the field, meteorological characteristics, particularly, characteristics related to wind (i.e., wind speeds and wind directions) greatly affect a shot.

The currently applicable technology is just a technology that informs a user of the wind characteristics measured by a golf distance measurement device as described above or the wind characteristics received from an external server in a form that may be checked by the user.

A golfer may check a distance to a target through the laser or GPS, but it is very difficult to determine an exact strength of a shot unless the golfer is the highly skilled because the golfer has to consider the effect of wind by himself or herself.

DISCLOSURE

Technical Problem

An objective of the present disclosure is to solve the problems of the related art.

Another objective of the present disclosure is to recommend a distance for golf by reflecting characteristics of wind, thereby enabling easy setting of a shot distance from a golfer's perspective.

The objectives of the present disclosure are not limited to the objectives mentioned above, and other objectives not mentioned herein will be clearly understood from the following description.

Technical Solution

According to an exemplary embodiment of the present disclosure for achieving the above objectives, there is provided a recommended distance provision method for providing a recommended distance in consideration of characteristics of wind by a distance recommendation device for golf, the method including: calculating a horizontal distance, a vertical distance, and the recommended distance of a shot, which are distances to a target without considering an influence of the wind, on the basis of measurement information comprising a straight-line distance to the target and an inclination to the target, which are from a current position; calculating a horizontal distance correction value for the horizontal distance on the basis of information on a wind direction and a wind speed; calculating an adjusted landing angle for a preset landing angle on the basis of the information on the wind direction and the wind speed; and calculating an additional distance correction value on the basis of the adjusted landing angle and the vertical distance, and calculating a final recommended distance by adding the calculated additional distance correction value and the horizontal distance correction value.

The calculating of the horizontal distance correction value may include: calculating a first rate differently applied according to the wind direction relative to a target direction; calculating a second rate proportional to the wind speed, inversely proportional to the horizontal distance, and proportional to the first rate; and obtaining the horizontal distance correction value by adding a product of the horizontal distance and the second rate to the horizontal distance or by subtracting the product of the horizontal distance and the second rate from the horizontal distance.

The second rate may be a value to which a coefficient is applied so that the second rate is calculated to yield a higher value in a case of a head wind than in a case of a tailwind.

The calculating of the adjusted landing angle may include: calculating a landing angle correction value proportional to the wind speed, inversely proportional to the preset landing angle, and proportional to the first yaw rate; and obtaining the adjusted landing angle by adding the landing angle correction value to the preset landing angle or by subtracting the landing angle correction value from the preset landing angle.

The landing angle correction value may be a value to which a coefficient is applied, so that the landing angle correction value is calculated to yield a higher value in a case of a head wind than in a case of a tailwind.

According to another exemplary embodiment of the present disclosure, there is provided a distance recommendation device for golf, the device including: a wind characteristic measurement unit configured to measure a wind direction and a wind speed; a distance measurement unit configured to calculate a horizontal distance, a vertical distance, and a recommended distance of a shot, which are distances to a target without considering an influence of the wind, on the basis of measurement information comprising a straight-line distance to the target and an inclination to the target, which are from a current position; and a wind influence reflection unit configured to calculate a horizontal distance correction value for the horizontal distance on the basis of information on the wind direction and the wind speed, calculate an adjusted landing angle for a preset landing angle on the basis of the information on the wind direction and the wind speed, and calculate an additional distance correction value on the basis of the adjusted landing angle and the vertical distance, and calculating a final recommended distance by adding the calculated additional distance correction value and the horizontal distance correction value.

Advantageous Effects

According to the exemplary embodiment of the present disclosure, since the distance for golf is recommended by reflecting the characteristics of wind, the golfer may be able to set the shot distance easily.

DESCRIPTION OF DRAWINGS

FIG. 1 is a view illustrating a configuration of golf distance recommendation device for golf according to an exemplary embodiment of the present disclosure.

FIG. 2 is a configuration diagram illustrating an operation of a wind characteristic measurement unit according to the exemplary embodiment of the present disclosure.

FIG. 3 is a block diagram illustrating an internal configuration of the distance recommendation device according to the exemplary embodiment of the present disclosure.

FIG. 4 is a view illustrating a method of calculating a recommended distance in a state without considering wind characteristics according to the exemplary embodiment of the present disclosure.

FIG. 5 is a view illustrating a wind speed according to the exemplary embodiment of the present disclosure.

FIG. 6 is a view illustrating information provided according to the exemplary embodiment of the present disclosure.

MODE FOR INVENTION

The detailed description of the present disclosure described below refers to the accompanying drawings illustrating specific exemplary embodiments in which the present disclosure may be implemented. These exemplary embodiments are described in sufficient detail to enable those skilled in the art to implement the present disclosure. It should be understood that the various exemplary embodiments of the present disclosure are different, but are not necessary to be mutually exclusive. For example, specific shapes, structures, and characteristics described herein may be implemented in other embodiments without departing from the spirit and scope of the present disclosure in relation to one embodiment. In addition, it is to be understood that a position or arrangement of individual components in each disclosed embodiment may be changed without departing from the spirit and scope of the present disclosure. Accordingly, the detailed description to be described below is not intended to be taken in a limiting sense, and the scope of the present disclosure is limited only by the appended claims, along with all scopes equivalent to those claimed by the claims, when properly described. Like reference numerals in the drawings refer to the same or similar functions over several aspects.

Hereinafter, in order to enable those skilled in the art to easily implement the present disclosure, various preferred exemplary embodiments of the present disclosure will be described in detail with reference to the accompanying drawings.

FIG. 1 is a view illustrating a configuration of a distance recommendation device for golf according to an exemplary embodiment of the present disclosure.

Referring to FIG. 1, a wind characteristic measurement unit 110 may be mounted on at least a part of the distance recommendation device 100.

As an example of the distance recommendation device 100, FIG. 1 illustrates a laser distance measurement device including: a first objective lens L1 for receiving light from the outside or a subject; a second objective lens L2 for receiving a reflected laser beam when the laser beam emitted from the distance recommendation device 100 is reflected by a target; and an eyepiece L3 for allowing a golfer to see the subject with the naked eye. However, according to the exemplary embodiment of the present disclosure, the distance recommendation device 100 may be replaced with a GPS-type distance measurement device or other devices.

That is, regardless of the types of devices, as long as the wind characteristic measurement unit 110 to be described below is mounted, it should be understood that the devices belong to the scope of the present disclosure.

In the distance recommendation device 100 shown in FIG. 1, the wind characteristic measurement unit 110 may be mounted between the first objective lens L1 and the second objective lens L2.

Meanwhile, the distance recommendation device 100 may include a button 120 for activating the wind characteristic measurement unit 110.

FIG. 2 is a configuration diagram illustrating the operation of the wind characteristic measurement unit according to the exemplary embodiment of the present disclosure.

Referring to FIG. 2, the wind characteristic measurement unit 110 mounted on the distance recommendation device 100 may be configured to include a plurality of voice reception units M1, M2, and M3, for example, microphones.

Although it is illustrated in FIG. 2 that three voice reception units M1, M2, and M3 are provided, it is sufficient when just the plurality of voice reception units is included.

Respective distances between centers of the plurality of voice reception units M1, M2, and M3 and a center of the wind characteristic measurement unit 110 are all arranged to be the same. In addition, it is preferable that respective distances between the centers of the neighboring voice reception units M1, M2, and M3 are all equally arranged.

Each of the voice reception units M1, M2, and M3 may receive an airflow noise generated due to discontinuous surfaces. To receive this airflow noise, each of the voice reception units M1, M2, and M3 may further include a component that forms discontinuous surfaces of air, for example, an inhalation guide hole. When a wind blows, air is scattered by the discontinuous surfaces of the air and a partial change in air pressure occurs, and this change in the air pressure forms a sound pressure and generates the airflow noise. The inhalation guide hole of the voice reception units M1, M2, and M3 may be manufactured in a form for causing air scattering and air flow. The noise received by the voice reception units M1, M2, and M3 may be converted into a digital signal by an A/D converter and may be filtered by a filter that passes only a frequency band corresponding to the wind noise.

A wind speed is calculated by a software method. A wind speed value may be calculated on the basis of levels of signals that are received, converted, and filtered by the plurality of voice reception units M1, M2, and M3.

In addition, a wind direction may also be calculated by a software method. A current wind direction may be determined according to a ratio between the levels of the noise signals collected by the plurality of voice reception units M1, M2, and M3, which are uniformly arranged at each azimuth relative to the center of the wind characteristic measurement unit 110.

For example, when voice signals are received from the respective voice reception units M1, M2, and M3 in the waveforms shown in FIG. 2, it may be confirmed that a wind blows in a direction in which a wind noise is the largest in a second voice reception unit M2, and the wind noise is the smallest in the third voice reception unit M3.

According to the exemplary embodiment of the present disclosure, wind characteristics measured by the above method, i.e., data on wind directions and wind speeds, may be reflected in generating the distance recommendation information for golf.

Hereinafter, a method of providing the distance recommendation information for golf according to the exemplary embodiment will be described with reference to FIG. 3.

FIG. 3 is a block diagram illustrating an internal configuration of the distance recommendation device according to the exemplary embodiment of the present disclosure.

Referring to FIG. 3, the distance recommendation device 100 according to the exemplary embodiment may be configured to include a wind characteristic measurement unit 110, a button 120, a user input information reception unit 130, a distance measurement unit 140, a wind influence reflection unit 150, and a display unit 160.

Some operation modules of the wind characteristic measurement unit 110, and the user input information reception unit 130, distance measurement unit 140, and wind influence reflection unit 150 may be program modules or pieces of hardware, which are capable of communicating with an external device. Such program modules or pieces of hardware may be included in the distance recommendation device 100 or other devices capable of communicating with the distance recommendation device 100 in the forms of operating systems, application program modules, and other program modules, and may be physically stored in various known storage devices. Meanwhile, such program modules or pieces of hardware include, but are not limited to, routines, subroutines, programs, objects, components, data structures, and the like, which are performing specific tasks or execute specific abstract data types, which will be described according to the present disclosure.

The wind characteristic measurement unit 110 performs a function of measuring current wind characteristics, that is, wind directions and wind speeds, according to the method described with reference to FIG. 2. To this end, the wind characteristic measurement unit 110 may be configured to include a plurality of voice reception units, an A/D converter, a filter unit, and the like.

As described with reference to FIG. 1, the button 120 performs a function of turning on/off the wind characteristic measurement unit 110 when being operated by a golfer.

The user input information reception unit 130 performs a function of receiving reference information input from the distance recommendation device 100 or a separate device capable of communicating therewith, for example, a separate smart device, etc. Here, the reference information refers to information for determining an angle between a vertical line and a direction in which a golf ball hits the ground after a golfer has made a shot, that is, a landing angle. The landing angle is used to calculate a recommended distance for the shot to hit the golf ball to a target.

The reference information may be, for example, a distance at which a golf ball may be sent when a shot is made by using a 7-iron 7i by each golfer. Such reference information may be input by the user or may be preset (e.g., 140 m or 150 m).

By referring to a straight-line distance to the target, an inclination angle, reference information, and the like, the distance measurement unit 140 performs a function of calculating a recommended distance for hitting a shot to hit a golf ball to a target in a state without considering the characteristics of wind.

Hereinafter, with reference to FIG. 4, a method of calculating a recommended distance by the distance measurement unit 140 without considering the characteristics of wind will be described.

Referring to FIG. 4, first, the distance measurement unit 140 measures a straight-line distance A, to a target T, from a current position of the distance recommendation device 100, that is, a position of a golfer. For example, a distance to the target may be measured by measuring a time when a laser beam is emitted to the target and the emitted laser beam is reflected and returned by the target thereafter and multiplying the measured time and the speed of the laser beam.

Here, it is assumed that the straight-line distance A measured in this way is 170 m.

Meanwhile, the distance measurement unit 140 may measure an inclination angle B between the current position and the position of the target. A gyro sensor may be included to measure the inclination angle B. It is assumed that the measured inclination angle B is −7°, that is, it is assumed that the target T exists at a position of 7° of a downhill slope relative to the position of the distance recommendation device 100.

The distance measurement unit 140 may calculate a horizontal distance X and a vertical distance Y, which are from the current position to the target T, with reference to the straight-line distance A and the inclination angle B, as in the following Equations 1 and 2.

$$X = A \cdot \cos B = 170 \text{ m} \cdot \cos 7° = 168.7 \text{ m} \qquad \text{[Equation 1]}$$

$$Y = A \cdot \sin B = 170 \text{ m} \cdot \sin -7° = -20 \text{ m} \qquad \text{[Equation 2]}$$

A negative (−) vertical distance Y refers that the target T is downward from the golfer's current position.

Meanwhile, the distance measurement unit 140 calculates an additional distance Z for hitting the golf ball to the target T as in Equation 3 below.

$$Z = Y \cdot \tan C \qquad \text{[Equation 3]}$$

In Equation 3, C denotes a landing angle described above, and may vary depending on reference information input by a user or may be preset, that is, shot distances of the 7-iron. The landing angle may be extracted through information stored in a table form. For example, as shown in Table 1 below, the landing angle for each reference distance of the 7-iron may be pre-stored.

TABLE 1

| Reference information (7 iron distance) (unit: m) | Landing angle (unit: °) |
|---|---|
| 210 | 53 |
| 200 | 41 |
| 190 | 47 |
| 180 | 44 |
| 170 | 47 |
| 160 | 45 |
| 150 | 44 |
| 140 | 43 |
| 130 | 43 |
| 120 | 43 |
| 110 | 42 |
| 100 | 41 |

Assuming that a user inputs 150 m as reference information, a landing angle, that is, a C value in Equation 3 becomes 44°. Accordingly, the additional distance Z becomes −20 m (=(−20 m)*tan(44°)). When wind is not taken into account, a distance recommended to a user in a current state is calculated as the sum of the horizontal distance X to the target T and the additional distance Z, and in the example above, the distance 148.7 m (=168.7 m-20 m) may be calculated.

Referring back to FIG. 3, the wind influence reflection unit 150 according to the exemplary embodiment performs a function of reflecting an influence of a wind on the recommended distance calculated by the distance measurement unit 140 to calculate a final recommended distance.

First, the wind influence reflection unit 150 calculates a wind direction relative to a straight line connecting a current position and a target T. Since an absolute direction of the wind is measured by the wind characteristic measurement unit 110, the wind influence reflection unit 150 may calculate the wind direction WD relative to the straight line in this way. The direction of the target T from the current position may be confirmed through the direction of the target T set when the distance is measured.

For example, as shown in FIG. 5, when the wind direction WD is within 0° to 90° or 271° to 359° with respect to the target direction TD, it may be a tailwind, that is, a wind blowing from the rear to the front, and when the wind direction WD is within 91° to 270°, it may be a head wind, that is, a wind blowing from the front to the rear. Here, it is assumed that the wind direction WD is 270°.

In addition, the wind influence reflection unit 150 calculates a first rate WER applied depending on wind directions. When a wind direction WD relative to a direction of a target T is 180° or less, a first rate WER is calculated according to Equation 4 below.

$$WED = \left| \frac{WD - 90°}{90°} \right| \qquad \text{[Equation 4]}$$

In addition, when a wind direction WD exceeds 180° and is less than or equal to 359°, a first rate WER is calculated according to Equation 5 below.

$$WED = \left| \frac{WD - 270°}{90°} \right| \qquad \text{[Equation 5]}$$

The first rate WER is a variable for reflecting the degree of an influence of a wind speed on a golf ball according to the wind direction WD, and has a value of 0 (zero) or more and 1 or less. When the wind direction WD is 0° or 180°, the first rate WER becomes 1 according to Equation 4 above. That is, when the wind direction WD coincides with the direction of the target T or is completely reversed, the wind speed is reflected in calculation of a final recommended distance as it is.

In the above assumption, since the wind direction WD is 270°, the first rate WER becomes zero according to Equation 5.

In addition, according to a wind speed WP measured by the wind characteristic measurement unit 110, the wind influence reflection unit 150 calculates a second rate WDR according to an influence on the horizontal distance X to the target T, that is, an influence with which a golf ball received while being in the air.

First, when the wind direction WD is within 0° to 90° or 271° to 359° (i.e., in a case of a tailwind), the second rate WDR may be calculated by Equation 6 below.

$$WDR = WP \cdot \frac{k1}{X} \cdot WER \qquad \text{[Equation 6]}$$

In Equation 6, k1 is a tailwind coefficient, and may be set to, for example, 1.2.

In addition, when the wind direction WD is within 90° to 270° (i.e., in a case of a head wind), the second rate WDR may be calculated by Equation 7 below.

$$WDR = WP \cdot \frac{k2}{X} \cdot WER \qquad \text{[Equation 7]}$$

In Equation 7, k2 is a head wind coefficient, and may be set to, for example, 2.5.

As may be seen from Equations 6 and 7, the second rate WDR is set to be proportional to the wind speed WP, be inversely proportional to the horizontal distance X, and is calculated to yield a higher value in a case of the head wind than in a case of the tailwind.

As described above, when the wind direction WD is 270°, since the first rate WER is zero, the second rate WDR also becomes zero.

Meanwhile, the wind influence reflection unit 150 calculates a landing angle correction value WAA according to the influence of wind.

First, when the wind direction WD is within 0° to 90° or 271° to 359° (i.e., in the case of the tailwind), the landing angle correction value WAA may be calculated by Equation 8 below.

$$WAA = WP \cdot \frac{k3}{C} \cdot WER \qquad \text{[Equation 8]}$$

In Equation 6, k3 is a tailwind coefficient, and may be set to, for example, 62.

In addition, when the wind direction WD is within 90° to 270° (i.e., in the case of the head wind), the landing angle correction value WAA may be calculated by Equation 9 below.

$$WAA = WP \cdot \frac{k4}{C} \cdot WER \qquad \text{[Equation 9]}$$

In Equation 9, k4 is a head wind coefficient, and may be set to, for example, 100.

As may be seen from Equations 6 and 7, the landing angle correction value WAA is set to be proportional to the wind speed WP, be inversely proportional to an original landing angle C, and be calculated to yield a higher value in the case of the head wind than in the case of the tailwind.

As described above, when the wind direction WD is 270°, since the first yaw rate WER is zero, the landing angle correction value WAA also becomes zero.

The wind influence reflection unit 150 calculates an adjusted landing angle WLA on the basis of the landing angle correction value WAA.

When the wind direction WD is within 0° to 90° or 271° to 359° (i.e., in the case of the tailwind), the landing angle correction value WAA is added to the landing angle C, so as to calculate the adjusted landing angle WLA. When the wind direction WD is within 90° to 270° (i.e., in the case of the head wind), the landing angle correction value WAA is subtracted from the landing angle C, so as to calculate the adjusted landing angle WLA.

In the above example, when the wind direction WD is 270°, since the landing angle correction value WAA is zero, the adjusted landing angle WLA is still 44°.

The wind influence reflection unit 150 calculates a correction value Wx of the horizontal distance X on the basis of the second rate WDR described with reference to Equations 6 and 7 above.

First, when the wind direction WD is within 0° to 90° or 271° to 359° (i.e., in the case of the tailwind), the horizontal distance correction value Wx is calculated by the following Equation 10.

$$Wx = X - (X \cdot WDR) \qquad \text{[Equation 10]}$$

In addition, when the wind direction WD is within 90° to 270° (i.e., in the case of the head wind), the horizontal distance correction value Wx may be calculated by the following Equation 11.

$$Wx = X + (X \cdot WDR) \qquad \text{[Equation 11]}$$

Meanwhile, on the basis of the adjusted landing angle WLA, an additional distance correction value WAD for hitting a golf ball to a target T is calculated as in the following Equation 12.

$$WAD = Y \cdot \tan WLA \qquad \text{[Equation 12]}$$

In the above example, when the wind direction is 270°, since the adjusted landing angle WLA is 44°, the additional distance correction value WAD becomes −20 m.

By summing the horizontal distance correction value Wx and the additional distance correction value WAD, the wind influence reflection unit 150 finally calculates the final recommended distance in which the influence of the wind is reflected. In the above example, since the horizontal distance correction value Wx and the additional distance correction value WAD are respectively 168.7 m and −20 m, the final recommended distance becomes 148.7 m.

As shown in FIG. 6, the measured and calculated values may be displayed in a form that may be checked by the user through the display unit 160 of the distance recommendation device 100, for example, a viewfinder.

Referring to FIG. 6, the final recommended distance in consideration of the wind speed, the wind direction, the straight-line distance to the target, and the wind characteristics may be displayed together.

According to the exemplary embodiment of the present disclosure, since the distance for golf is recommended by reflecting the characteristics of the wind, the golfer may easily set the shot distance from the golfer's perspective.

The above description of the present disclosure is for illustration, and it will be understood that those skilled in the art to which the present disclosure pertains may easily transform the present disclosure in other specific forms without departing from the technical spirit or essential features thereof. Therefore, it should be understood that the above-described exemplary embodiments are illustrative in all respects and not restrictive. For example, each component described as a single type may be implemented in a distributed manner, and similarly, components described as distributed may be implemented in a combined form.

The scope of the present disclosure is indicated by the following claims, and all changes or modifications derived from the meaning and scope of the claims and equivalent concepts should be interpreted as being included in the claims of the present disclosure.

The invention claimed is:

1. A distance recommendation device for golf, the device comprising:
   a wind characteristic measurement unit configured to measure a wind direction and a wind speed;
   a distance measurement unit configured to calculate a horizontal distance, a vertical distance, and a recommended distance of a shot, which are distances to a target without considering an influence of the wind, on the basis of measurement information comprising a straight-line distance to the target and an inclination to the target, which are from a current position; and
   a wind influence reflection unit configured to calculate a horizontal distance correction value for the horizontal distance on the basis of information on the wind direction and the wind speed, calculate an adjusted landing angle for a preset landing angle on the basis of the information on the wind direction and the wind speed, and calculate an additional distance correction value on the basis of the adjusted landing angle and the vertical distance, and calculating a final recommended distance by adding the calculated additional distance correction value and the horizontal distance correction value, wherein the wind characteristic measurement unit comprises a plurality of voice reception units to receive an airflow noise generated due to air crossing a discontinuous surface, wherein the wind characteristic measurement unit calculates a wind speed value on the basis of levels of signals received by the plurality of voice reception units, wherein the wind characteristic measurement unit calculates a wind direction according to a ratio between the levels of the signals received by the plurality of voice reception units.

2. The device of claim 1, wherein the wind influence reflection unit is configured to:

calculate a first rate according to the wind direction relative to a target direction;

calculate a second rate proportional to the wind speed, inversely proportional to the horizontal distance, and proportional to the first rate; and obtain the horizontal distance correction value by adding a product of the horizontal distance and the second rate to the horizontal distance or by subtracting the product of the horizontal distance and the second rate from the horizontal distance.

3. The device of claim 2, wherein the second rate is a value to which a coefficient is applied so that the second rate is calculated to yield a higher value in a case of a head wind than in a case of a tailwind.

4. The device of claim 2, wherein the wind influence reflection unit is configured to:

calculate a landing angle correction value proportional to the wind speed, inversely proportional to the preset landing angle, and proportional to the first rate; and obtain the adjusted landing angle by adding the landing angle correction value to the preset landing angle or by subtracting the landing angle correction value from the preset landing angle.

5. The device of claim 4, wherein the landing angle correction value is a value to which a coefficient is applied, so that the landing angle correction value is calculated to yield a higher value in a case of a head wind than in a case of a tailwind.

* * * * *